United States Patent [19]
Taniguchi

[11] Patent Number: 5,475,696
[45] Date of Patent: Dec. 12, 1995

[54] REMOTE ALARM TRANSFER METHOD AND SYSTEM

[75] Inventor: Ikuo Taniguchi, Kanagawa, Japan

[73] Assignee: Fujitsu Limited, Kanagawa, Japan

[21] Appl. No.: 783,440

[22] Filed: Oct. 28, 1991

[30] Foreign Application Priority Data

Oct. 30, 1990 [JP] Japan .................................. 2-293086

[51] Int. Cl.[6] .......................... H03M 13/00; G06F 11/00; G06F 11/34; H04L 12/00
[52] U.S. Cl. ...................... 371/42; 395/185.01; 371/47.1
[58] Field of Search ............................. 371/42, 46, 47.1; 364/265.1, 266.1, 931.48; 395/575

[56] References Cited

U.S. PATENT DOCUMENTS

| | | | |
|---|---|---|---|
| 4,172,963 | 10/1979 | Belcher et al. | 364/200 |
| 4,312,066 | 1/1982 | Bantz et al. | 371/16 |
| 4,354,229 | 10/1982 | Davis et al. | 364/200 |
| 4,468,734 | 7/1984 | Lanier et al. | 364/200 |
| 4,646,235 | 2/1987 | Hirosawa et al. | 364/200 |
| 5,084,891 | 1/1992 | Ariyansitakal et al. | 371/42 |
| 5,121,486 | 6/1992 | Kurihara et al. | 395/325 |
| 5,131,012 | 7/1992 | Drarida | 371/47.1 |

Primary Examiner—Robert W. Beausoliel, Jr.
Assistant Examiner—T. Tu
Attorney, Agent, or Firm—Nikaido, Marmelstein, Murray & Oram

[57] ABSTRACT

An asynchronous transfer mode (ATM) cross-connect unit is used in an ATM communication system which includes at least two communication stations which may be coupled via a plurality of ATM cross-connect units. The ATM cross-connect unit includes an abnormality detector for outputting a detection signal when an abnormality is detected in a first input signal path, a synchronization error detector for outputting a detection signal when a synchronization error is detected in a signal received via the first input signal path, an alarm indication signal cell generator for generating an alarm indication signal cell when the detection signal is received, an alarm indication signal cell detector for outputting an alarm indication signal cell when an alarm indication signal cell is received, a remote alarm transfer cell generator for generating a remote alarm transfer cell, a path setting table in which an output signal path is set with respect to each input signal path and a remote alarm transfer path for transferring the remote alarm transfer cell to a remote communication station is set, and a control part for transferring the remote alarm transfer cell to the remote communication station via the first output signal path according to the remote alarm transfer path set in the path setting table.

18 Claims, 10 Drawing Sheets

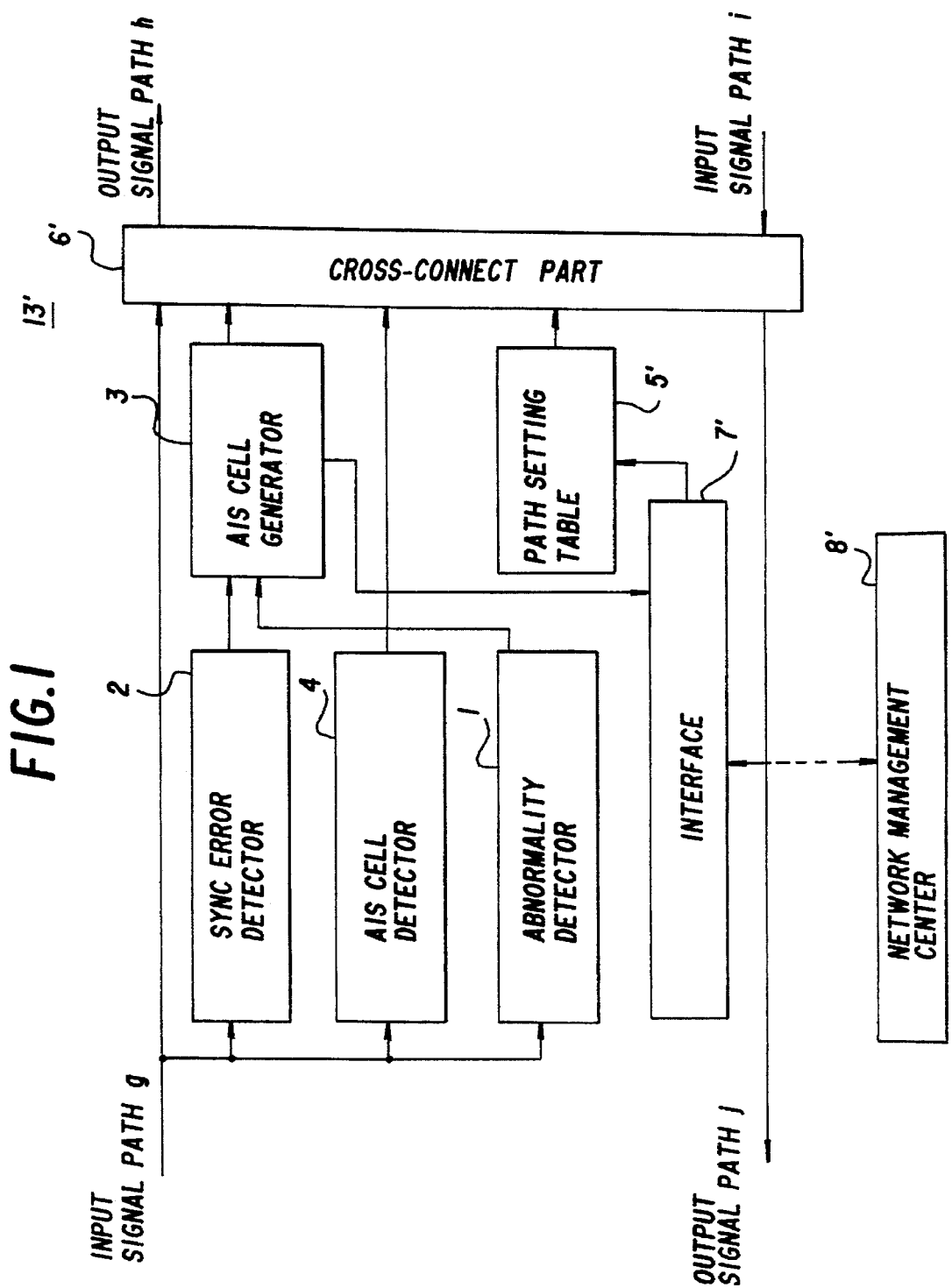

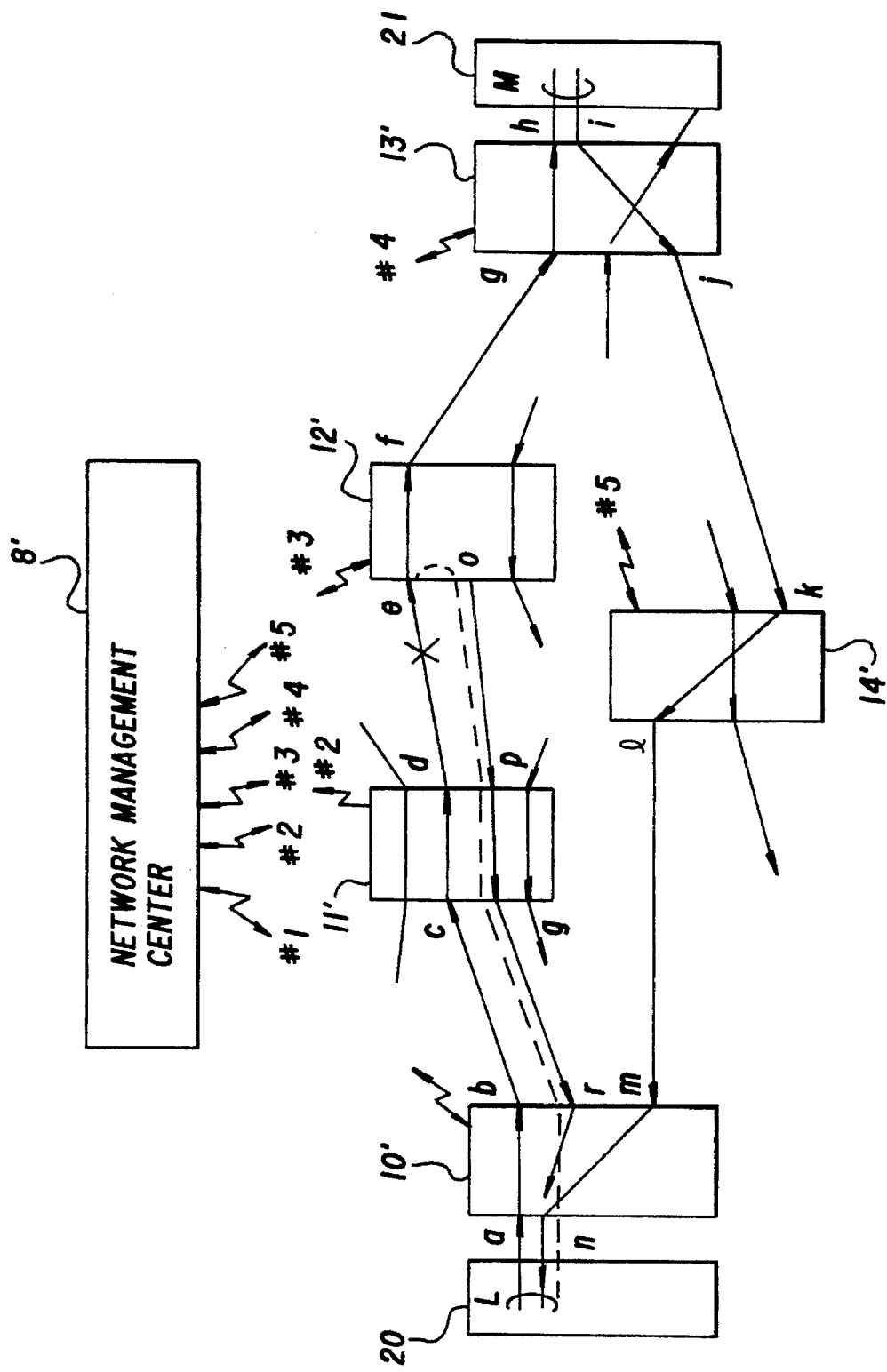

BEFORE FAULT NOTIFICATION

ATMXC 10'

| INPUT | OUTPUT |
|---|---|
| a | b |
| m | n |

ATMXC 11'

| INPUT | OUTPUT |
|---|---|
| c | d |

ATMXC 12'

| INPUT | OUTPUT |
|---|---|
| e | f |

ATMXC 13'

| INPUT | OUTPUT |
|---|---|
| g | h |
| i | j |

ATMXC 14'

| INPUT | OUTPUT |
|---|---|
| k | ℓ |

*FIG.3(A)*

AFTER FAULT NOTIFICATION

| INPUT | OUTPUT |
|---|---|
| a | b |
| m | n |
| r | n |

| INPUT | OUTPUT |
|---|---|
| c | d |
| p | q |

| INPUT | OUTPUT |
|---|---|
| e | f |
| | o |

| INPUT | OUTPUT |
|---|---|
| g | h |
| i | j |

| INPUT | OUTPUT |
|---|---|
| k | ℓ |

*FIG.3(B)*

ATMXC 10

| INPUT | OUTPUT | REMOTE STATION |
|-------|--------|----------------|
| a     | b      | n              |
| m     | n      | b              |

ATMXC 11

| INPUT | OUTPUT | REMOTE STATION |
|-------|--------|----------------|
| c     | d      | -              |

ATMXC 12

| INPUT | OUTPUT | REMOTE STATION |
|-------|--------|----------------|
| e     | f      | -              |

ATMXC 13

| INPUT | OUTPUT | REMOTE STATION |
|-------|--------|----------------|
| g     | h      | j              |
| i     | j      | h              |

ATMXC 14

| INPUT | OUTPUT | REMOTE STATION |
|-------|--------|----------------|
| k     | ℓ      | -              |

*FIG. 7*

REMOTE ALARM TRANSFER METHOD AND SYSTEM

BACKGROUND OF THE INVENTION

The present invention generally relates to remote alarm transfer methods and systems, and more particularly to a remote alarm transfer method for transferring an alarm to a remote station in an asynchronous transfer mode (ATM) cross-connect unit, and a system which employs such a remote alarm transfer method.

In an ATM transmission system, it is necessary, as in the case of a conventional synchronous transfer mode transmission system, to transfer an alarm to a remote station which transmitted a signal in order to notify the remote station that the signal transmitted therefrom cannot be received.

FIG. 1 shows a conceivable ATM cross-connect unit, FIG. 2 shows an alarm transfer path, and FIG. 3 shows a path setting table.

In FIG. 2, an ATM cross-connect unit 13' is located very close to a communication station 21, and FIG. 1 shows the ATM cross-connect unit 13' assuming that no fault exists in an upstream path i and a fault is generated only in a downstream path g.

In FIG. 2, ATM cross-connect units 11', 12' and 14' respectively have only an upstream or downstream path. An ATM cross-connect unit 10' is located very close to a communication station 20, and it is assumed that no fault exists in a downstream path a and a fault is generated only in an upstream path n.

In the ATM cross-connect unit 13' shown in FIG. 1, an alarm indication signal (AIS) cell generator 3 generates an AIS cell when an abnormality detector 1 detects an abnormality in a signal path or a synchronization error detector 2 detects a non-synchronized state of its own station. The AIS cell is supplied to a cross-connect part 6'. In addition, the AIS cell generator 3 notifies that a fault is detected and the AIS cell is generated to a network management center 8' via an interface 7'.

The cross-connect part 6' outputs the AIS cell according to a path which is determined by a path setting table 5'. The path setting table 5' specifies an output path for a signal which is input via an input path.

The network management center 8' sets an alarm transfer path for sending the AIS cell to the remote (or far end) station by sending path setting information to the path setting table 5' via the interface 7' when the fault detection is notified from the ATM cross-connect unit 13'. Then, the cross-connect part 6' transfers the AIS cell to the remote station according to the path which is set in the path setting table 5'.

Next, a description will be given of a remote alarm transfer path when a fault is generated in a communication path which is set in FIG. 2.

As shown in FIG. 3(A), input and output path names are set in the path setting tables of the ATM cross-connect units 10', 11', 12', 13' and 14'. In FIG. 3, each ATM cross-connect unit is denoted by "ATMXC". For example, the communication path is set in the ATM cross-connect unit 10' so that the signal input from L of the communication station 20 via the input path a is output to the output path b, and the communication path is set in the ATM cross-connect unit 11' so that the signal input via the input path c is output to the output path d. The communication path is set similarly for the other ATM cross-connect units 12', 13' and 14' as may be seen from FIG. 3(A), and as a result, the signal input from L of the communication station 20 is output to M of the communication station 21 via the paths a, b, c, d, e, f, g and h. On the other hand, the signal from M of the communication station 21 is input to L of the communication station 20 via the paths i, j, k, l, m and n.

In this case, when a fault is generated in the path between the ATM cross-connect units 11' and 12' as shown in FIG. 2, the AIS cell is transferred downstream via the paths f, g and h. In addition, the ATM cross-connect unit 12' notifies the network management center 8' that a fault is generated and the AIS cell is transmitted.

In order to transmit the AIS cell to the remote communication station 20, the network management center 8' transmits information for setting an alarm transfer path (paths o, p, q, r and n) to the ATM cross-connect units 12', 11' and 10'.

As shown in FIG. 3(B), the ATM cross-connect units 12', 11' and 10' write the input and output path names in the respective path setting tables 5'. Therefore, the AIS cell is transferred via the paths o, p, q, r and n, and the generation of the fault is notified to the remote communication station 20.

However, according to the conceivable ATM cross-connect unit described above, the ATM cross-connect unit notifies the fault to the network management center 8' when the fault is generated, and thereafter receives the alarm transfer path setting information from the network management center 8' and sets the alarm transfer path. Then, the ATM cross-connect unit transfers the AIS cell to the remote communication station. For this reason, there are problems in that it takes a considerably long time to transfer the AIS cell to the remote communication station, and there is a delay in transferring the fault information to the remote communication station. In addition, there is also a problem in that the control of the network management center 8' becomes complex.

SUMMARY OF THE INVENTION

Accordingly, it is a general object of the present invention to provide a novel and useful remote alarm transfer method and system in which the problems described above are eliminated.

Another and more specific object of the present invention is to provide an asynchronous transfer mode cross-connect unit for use in an asynchronous transfer mode communication system which includes at least two communication stations which may be coupled via a plurality of asynchronous transfer mode cross-connect units, comprising abnormality detecting means, coupled to a first input signal path, for outputting a detection signal when an abnormality is detected in the first input signal path, synchronization error detecting means, coupled to the first input signal path, for outputting a detection signal when a synchronization error is detected in a signal received via the first input signal path, alarm indication signal cell generating means, coupled to the abnormality detecting means and the synchronization error detecting means, for generating an alarm indication signal cell when the detection signal is received from at least one of the abnormality detecting means and the synchronization error detecting means, alarm indication signal cell detecting means, coupled to the first input signal path, for outputting an alarm indication signal cell when an alarm indication signal cell is received via the first input signal path, remote alarm transfer cell generating means, coupled to the abnormality detecting means, the synchronization error detecting means and the alarm indication signal cell detecting means, for generating a remote alarm transfer cell which indicates a failure based on the signals received from the abnormality detecting means, the synchronization error detecting means and the alarm indication signal cell detecting means, path setting table means in which an output signal path is set with respect to each input signal path and a remote alarm transfer path for transferring the remote alarm transfer cell to a remote communication station is set, and control means, coupled to the alarm indication signal cell generating means, the remote alarm transfer cell generating means, the path setting table means, a second input signal path and first and second output signal paths, for transferring the remote alarm transfer cell to the remote communication station via the first output signal path according to the remote alarm transfer path set in the path setting table means. According to the asynchronous transfer mode cross-connect system of the present invention, it is possible to transfer the remote alarm transfer cell to the remote communication station according to the remote alarm transfer path set in the path setting table means, and the remote alarm transfer path is not set by a network management center at every failure detection. Therefore, the remote alarm transfer cell is quickly transferred to the remote communication station, and the control of the network management center becomes simple.

Still another object of the present invention is to provide an asynchronous transfer mode communication system comprising an asynchronous transfer mode network including a plurality of asynchronous transfer mode cross-connect units, a first communication station provided on an upstream side of the asynchronous transfer mode network, and a second communication station provided on a downstream side of the asynchronous transfer mode network. Each of the asynchronous transfer mode cross-connect units comprises abnormality detecting means, coupled to a first input signal path on the upstream side, for outputting a detection signal when an abnormality is detected in the first input signal path, synchronization error detecting means, coupled to the first input signal path, for outputting a detection signal when a synchronization error is detected in a signal received via the first input signal path, alarm indication signal cell generating means, coupled to the abnormality detecting means and the synchronization error detecting means, for generating an alarm indication signal cell when the detection signal is received from at least one of the abnormality detecting means and the synchronization error detecting means, alarm indication signal cell detecting means, coupled to the first input signal path, for outputting an alarm indication signal cell when an alarm indication signal cell is received via the first input signal path, remote alarm transfer cell generating means, coupled to the abnormality detecting means, the synchronization error detecting means and the alarm indication signal cell detecting means, for generating a remote alarm transfer cell which indicates a failure based on the signals received from the abnormality detecting means, the synchronization error detecting means and the alarm indication signal cell detecting means, path setting table means in which an output signal path is set with respect to each input signal path and a remote alarm transfer path for transferring the remote alarm transfer cell to the first communication station is set, and control means, coupled to the alarm indication signal cell generating means, the remote alarm transfer cell generating means, the path setting table means, a second input signal path on the downstream side and first and second output signal paths respectively on the upstream and downstream sides, for transferring the remote alarm transfer cell to the first communication station via the first output signal path on the upstream side according to the remote alarm transfer path set in the path setting table means. According to the asynchronous transfer mode communication system of the present invention, it is possible to transfer the remote alarm transfer cell to the remote communication station according to the remote alarm transfer path set in the path setting table means, and the remote alarm transfer path is not set by a network management center at every failure detection. Therefore, the remote alarm transfer cell is quickly transferred to the remote communication station, and the control of the network management center becomes simple.

A further object of the present invention is to provide an asynchronous transfer mode cross-connect method for use in an asynchronous transfer mode communication system which includes at least two communication stations which may be coupled via a plurality of asynchronous transfer mode cross-connect units, comprising the steps of outputting a first detection signal from an asynchronous transfer mode cross-connect unit when an abnormality is detected in a first input signal path, outputting a second detection signal from the asynchronous transfer mode cross-connect unit when a synchronization error is detected in a signal received via the first input signal path, generating an alarm indication signal cell within the asynchronous transfer mode cross-connect unit when at least one of the first and second detection signals is received, generating a remote alarm transfer cell which indicates a failure based on the first and second detection signals and the alarm indication signal cell which is received via the first input signal path, and transferring the remote alarm transfer cell to a remote communication station via the first output signal path according to a remote alarm transfer path set in a path setting table in which an output signal path is also set with respect to each input signal path. According to the asynchronous transfer mode cross-connect method of the present invention, it is possible to transfer the remote alarm transfer cell to the remote communication station according to the remote alarm transfer path set in the path setting table means, and the remote alarm transfer path is not set by a network management center at every failure detection. Therefore, the remote alarm transfer cell is quickly transferred to the remote communication station, and the control of the network management center becomes simple.

Other objects and further features of the present invention will be apparent from the following detailed description when read in conjunction with the accompanying drawings.

BRIEF DESCRIPTION OF THE DRAWINGS

FIG. 1 is a system block diagram showing a conceivable ATM cross-connect unit;

FIG. 2 is a system block diagram for explaining an alarm transfer path;

FIG. 3 is a diagram for explaining path setting tables of the ATM cross-connect units shown in FIG. 2;

FIG. 7 is a diagram for explaining path setting tables of the ATM cross-connect units shown in FIG. 6;

DESCRIPTION OF THE PREFERRED EMBODIMENTS

First, a description will be given of an operating principle of the present invention, by referring to FIG. 4.

Figure 4:
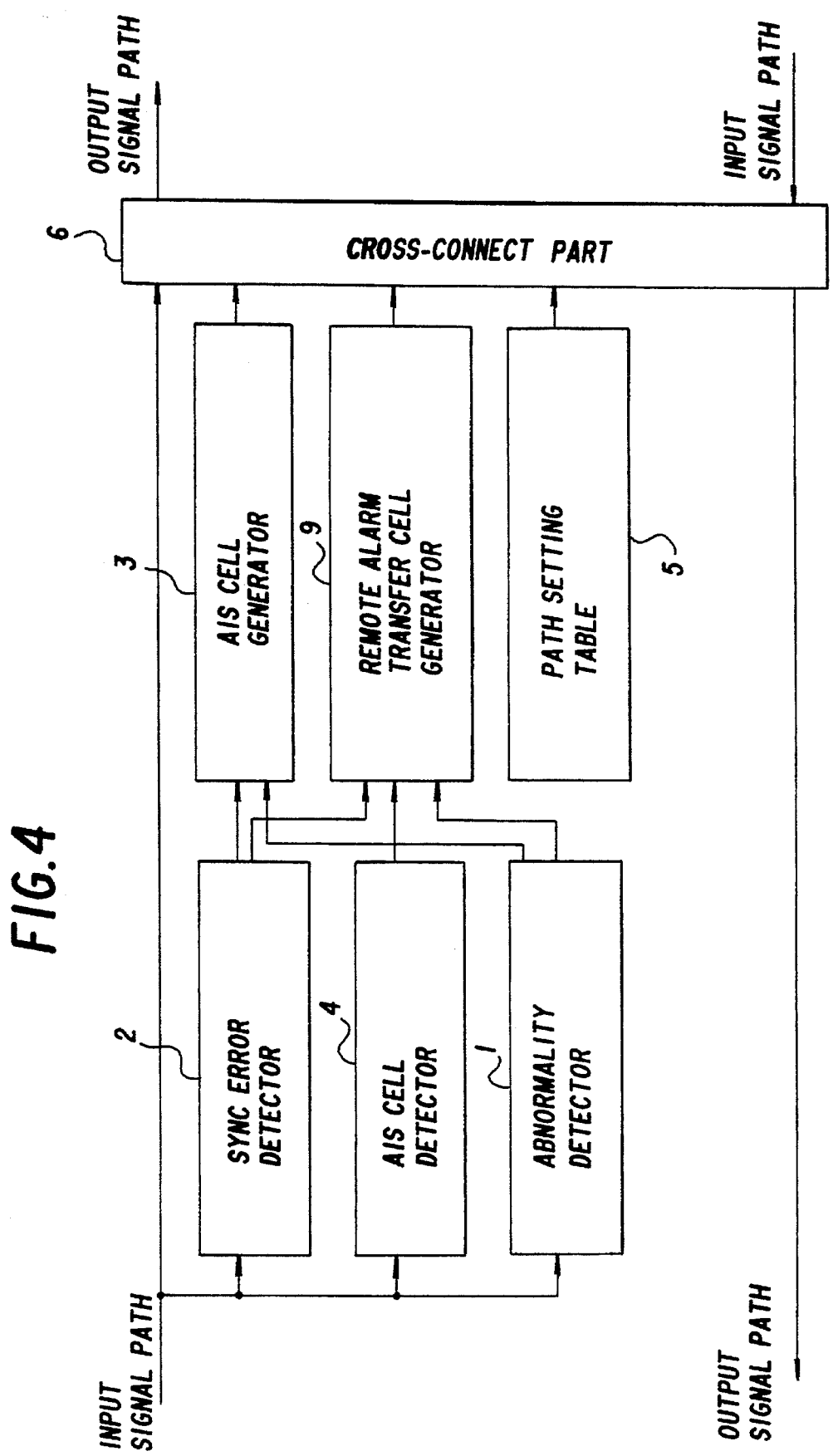
FIG. 4 is a system block diagram for explaining an operating principle of the present invention.

In an ATM cross-connect unit shown in FIG. 4, an abnormality detector 1, a synchronization error detector 2, an AIS cell detector 4 and a controller (cross-connect part) 6 are coupled to an input signal path. An AIS cell generator 3 receives signals from the abnormality detector 1 and the synchronization error detector 2. A remote alarm transfer cell generator 9 receives signals from the abnormality detector 1, the synchronization error detector 2 and the AIS cell detector 4. Output signals of the AIS cell generator 3, a path setting table 5 and the remote alarm transfer cell generator 9 are supplied to the controller 6.

The abnormality detector 1 outputs an abnormality detection signal when an abnormality is detected in the signal line. The synchronization error detector 2 outputs a synchronization error detection signal when a synchronization error is detected. The AIS cell generator 3 generates the AIS cell when the abnormality detector 1 outputs the abnormality detection signal or the synchronization error detector 2 outputs the synchronization error detection signal.

The AIS cell detector 4 outputs the AIS-cell which is received via the upstream input signal path. An output signal path with respect to the input signal path is set in the path setting table 5. The controller 6 outputs the AIS cells from the AIS cell generator 3 and the AIS cell detector 4 according to the path which is set in the path setting table 5.

The remote alarm transfer cell generator 9 generates a remote alarm transfer cell based on the output signals of the abnormality detector 1, the synchronization error detector 2 and the AIS cell detector 4, and transmits the remote alarm transfer cell to the controller 6.

A remote path for transferring the remote alarm transfer cell to the remote communication station is preset in the path setting table 5. Hence, when the remote alarm transfer cell is generated in the remote alarm transfer cell generator 9, the controller 6 transfers the remote alarm transfer cell according to the remote path which is preset in the path setting table 5.

Therefore, according to the present invention, when the remote alarm transfer cell generator 9 generates the remote alarm transfer cell in response to the output signals of the abnormality detector 1, the synchronization error detector 2 and the AIS detector 4 and supplies the remote alarm transfer cell to the controller 6, the controller 6 transmits the remote alarm transfer cell to the remote path which is preset in the path setting table 5. For this reason, the remote alarm transfer cell is transferred immediately to the remote communication station, and the AIS cell is transferred quickly to the remote communication station when the fault is generated.

On the other hand, a network management center (not shown in FIG. 4) does not need to set the path for transferring the AIS cell to the remote communication station. Consequently, the control of the network management center becomes simple compared to that of the conceivable system described above in conjunction with FIG. 1.

Figure 5:
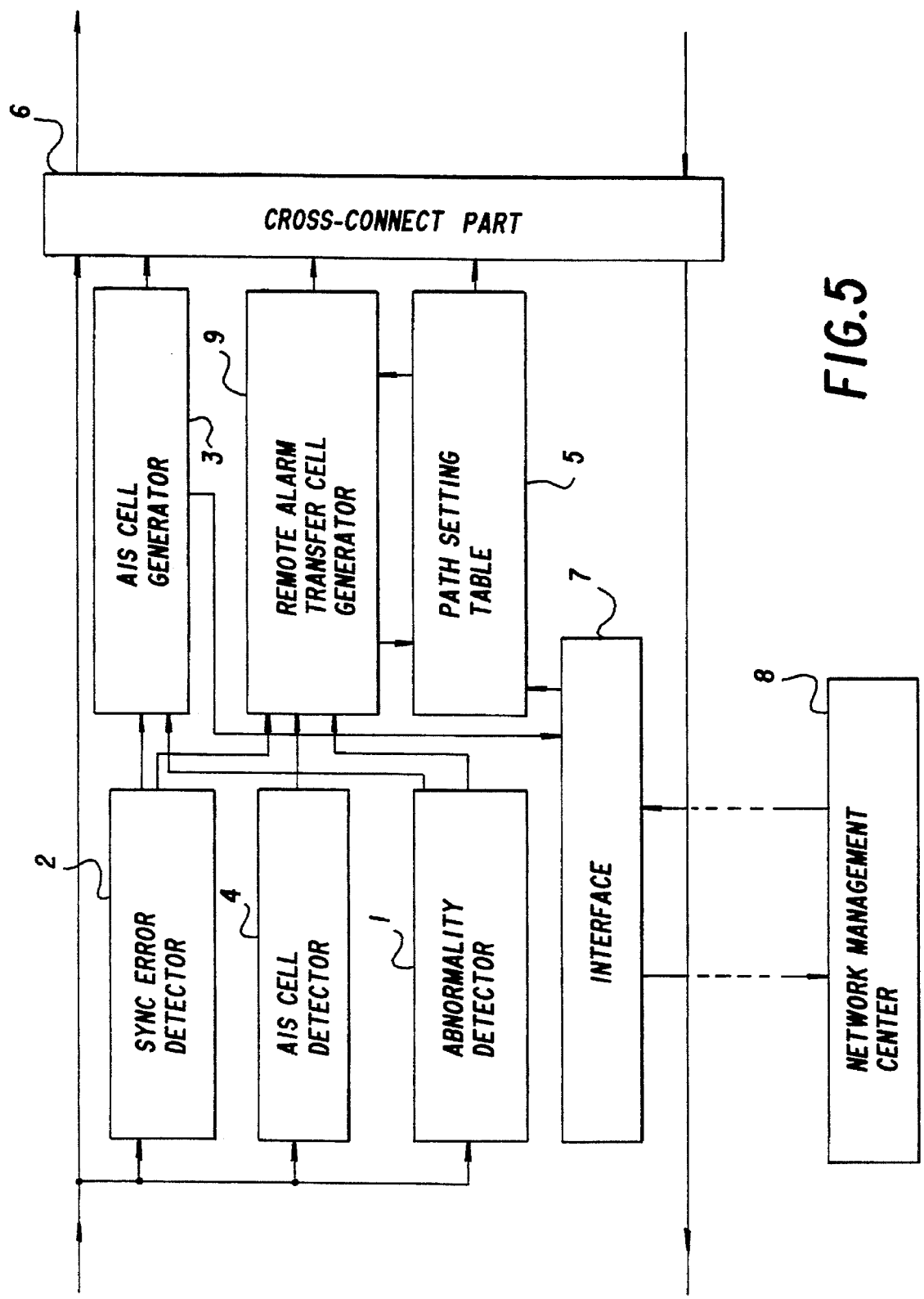
FIG. 5 is a system block diagram showing an embodiment of an ATM cross-connect unit used in an embodiment of a remote alarm transfer system according to the present invention.

Next, a description will be given of an embodiment of a remote alarm transfer system according to the present invention, by referring to FIGS. 5 through 7. FIG. 5 shows an embodiment of an ATM cross-connect unit used in this embodiment of the remote alarm transfer system, FIG. 6 shows a remote alarm transfer path of this embodiment, and FIG. 7 shows path setting tables of ATM cross-connect units shown in FIG. 6.

In FIG. 5, there basically are three different points compared to the conceivable ATM cross-connect unit shown in FIG. 1. First, the remote alarm transfer cell generator 9 generates a remote alarm transfer cell when the abnormality detector 1 detects an abnormality, the synchronization error detector 2 detects a synchronization error or the AIS cell detector 4 detects an AIS cell from the upstream input signal path, and the remote alarm transfer cell is supplied to the cross-connect part 6. Second, as shown in FIG. 7, a remote alarm transfer path for transferring the remote alarm transfer cell is preset in the path setting tables 5 of the ATM cross-connect units 10 and 13. Third, a network management center 8 does not set the remote alarm transfer path, and thus, the network management center 8 does not notify the remote alarm transfer path information to each of the ATM cross-connect units 10 through 14.

Figure 6:
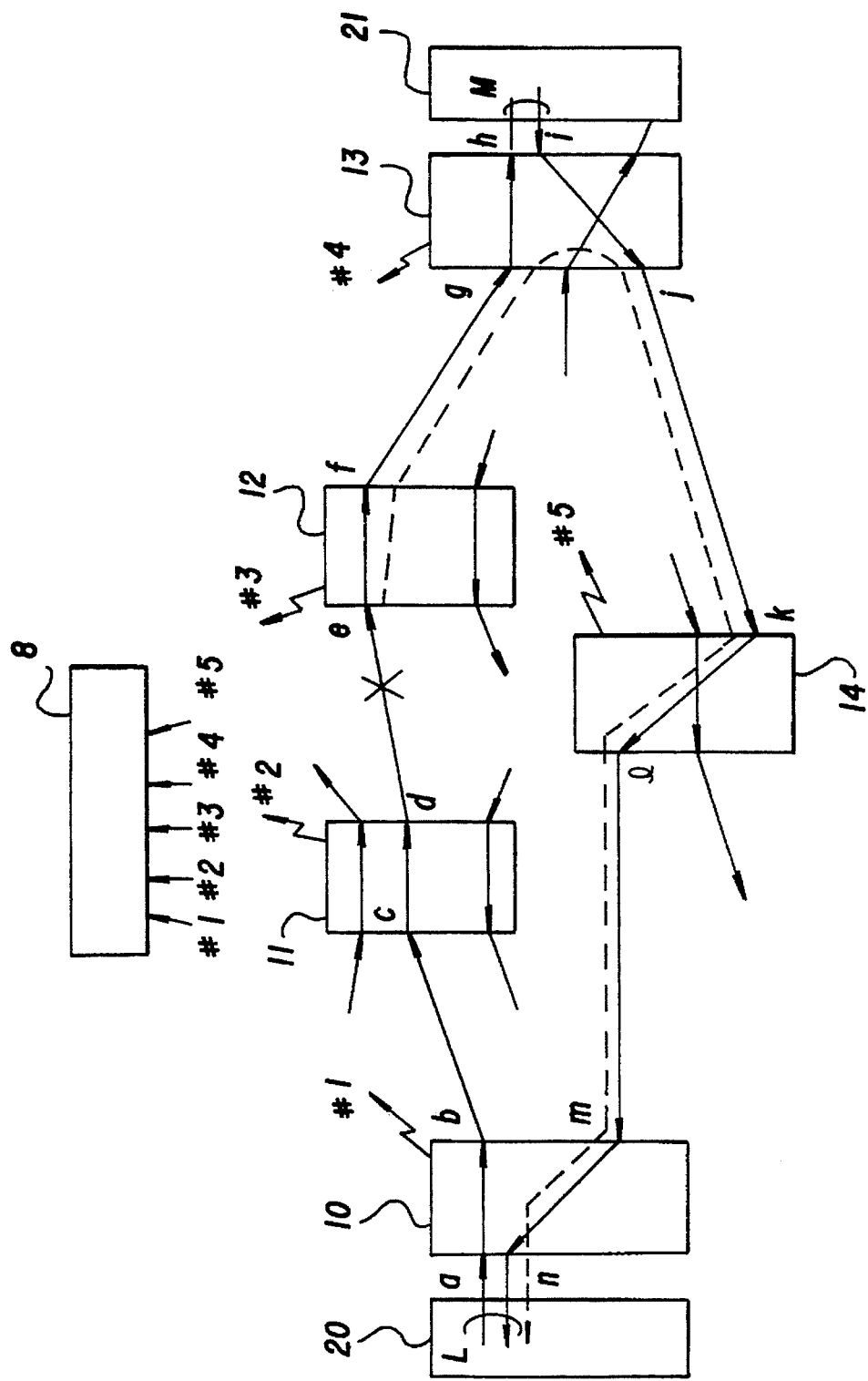
FIG. 6 is a diagram for explaining a remote alarm transfer path of the embodiment of the remote alarm transfer system.

In FIG. 6, the signal from L of a communication station 20 is output to M of a communication station 21 via communication paths a, b, c, d, e, f, g and h according to the path setting tables 5 of each of the ATM cross-connect units 10 through 14, similarly as in the case described above in conjunction with FIG. 2. In addition, the signal from M of the communication station 21 is input to L of the communication station 20 via the communication paths i, j, k, l, m and n according to the path setting tables 5 of each of the ATM cross-connect units 10 through 14.

Figure 8:
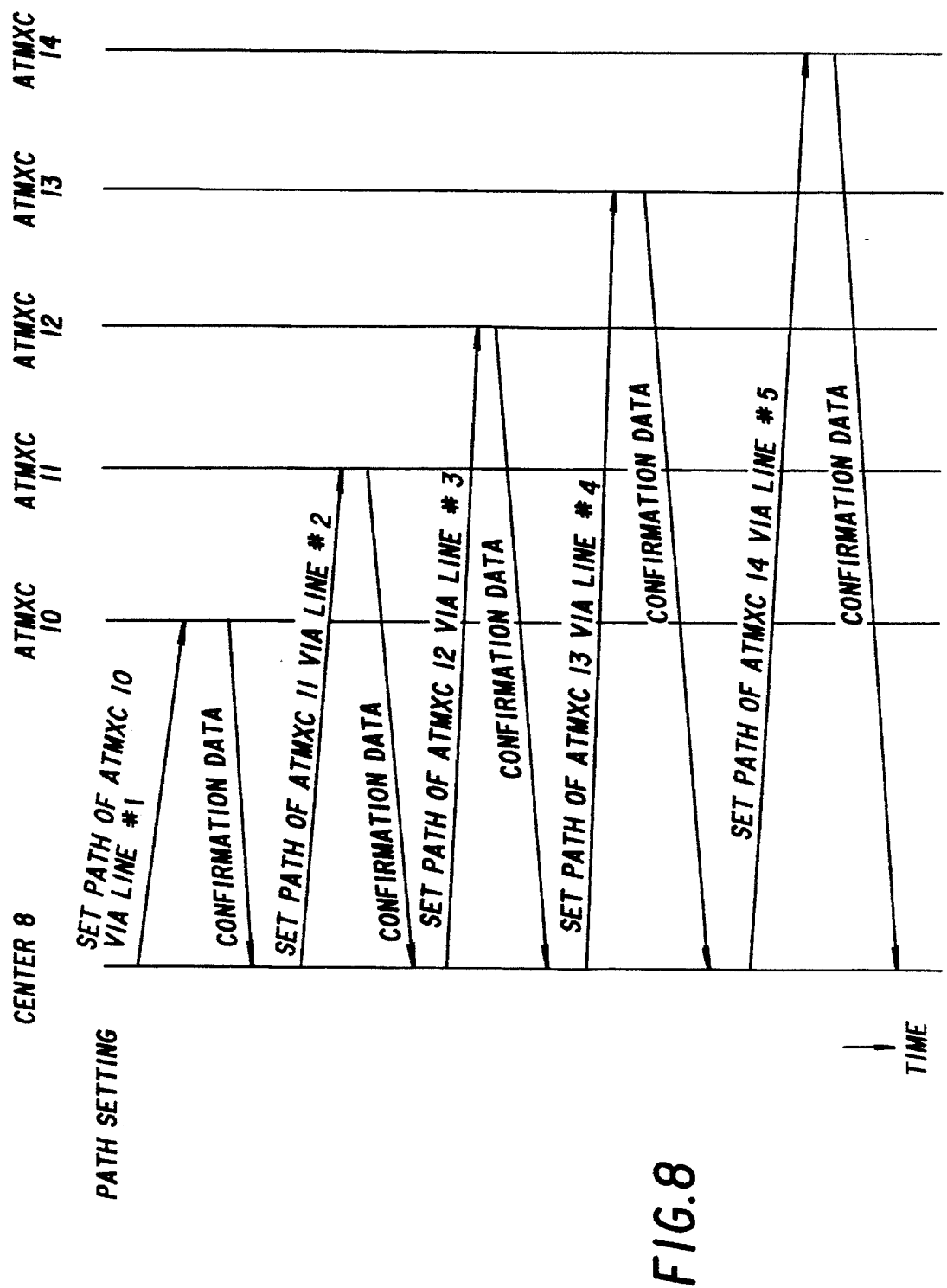
FIG. 8 is a time chart for explaining an operation of the embodiment of the remote alarm transfer system when presetting paths in the path setting tables.

FIG. 8 is a time chart for explaining an operation of presetting the paths in the path setting tables 5 of the ATM cross-connect units 10 through 14. In this case, the network management center 8 sets the path in the path setting table 5 of the ATM cross-connect unit 10 via a line #1 shown in FIG. 6, and the ATM cross-connect unit 10 sends confirmation data to the network management center 8 after the path is set. The confirmation data is sent to the network management center 8 so that it is possible to confirm the correct setting of the path. Similarly, the network management center 8 sets the paths in the path setting tables 5 of the ATM cross-connect units 11 through 14 via lines #2 through #5, and the confirmation data from each of the ATM cross-connect units 11 through 14 are sent to the network management center 8. As a result, the paths are set in the path setting tables 5 as shown in FIG. 7. For example, the network management center 8 may set the paths in the path setting tables 5 during an initializing operation. Further, other paths may be set in addition to those shown in FIG. 7.

A description will be given of a case where a fault is generated in the path between the ATM cross-connect units 11 and 12.

Figure 9:
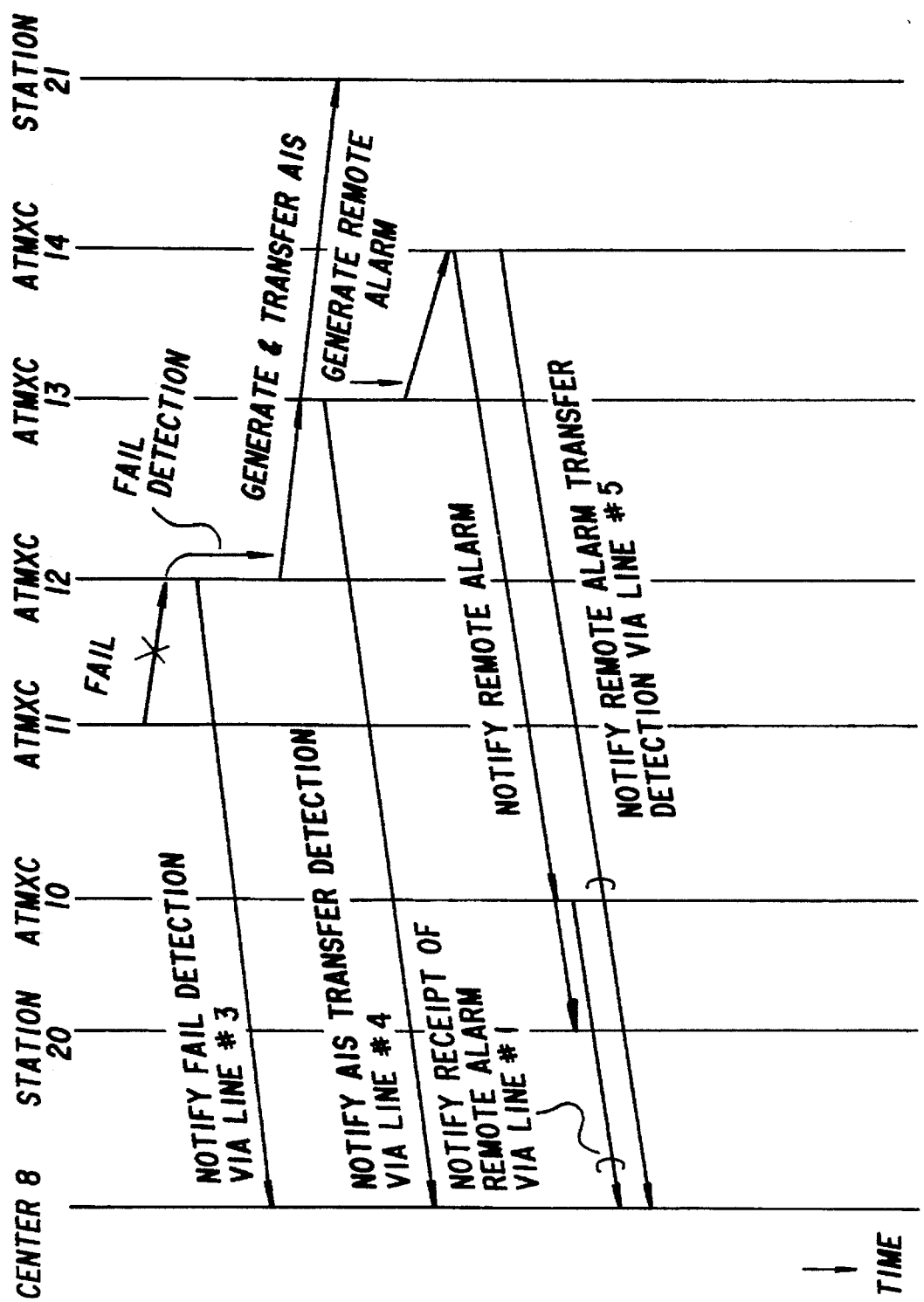
FIG. 9 is a time chart for explaining an operation of the embodiment of the remote alarm transfer system when a fault is generated.

In this case, the abnormality detector 1 of the ATM cross-connect unit 12 detects an abnormality, and the AIS cell generator 3 of the ATM cross-connect unit 12 sends the AIS cell to the downstream output signal path as shown in FIG. 9 according to the path setting table 5 shown in FIG. 7. In FIG. 7, each ATM cross-connect unit is denoted by "ATMXC". In addition, the ATM cross-connect unit 12 notifies the detection of the failure and the generation of the AIS cell to the network management center 8 via a line #3 shown in FIG. 6. Although the remote alarm transfer cell generator 9 of the ATM cross-connect unit 12 generates the remote alarm transfer cell, the remote alarm transfer cell is not transmitted because no remote path is set in the path setting table 5 of the ATM cross-connect unit 12.

At the ATM cross-connect unit 13, the AIS cell detector 4 detects the incoming AIS cell and supplies this AIS cell to the remote alarm transfer cell generator 9. As a result, the remote alarm transfer cell generator 9 generates the remote alarm transfer cell and supplies this remote alarm transfer cell to the cross-connect part 6. The cross-connect part 6 transfers the remote alarm transfer cell to the remote path j which is preset according to the path setting table 5 shown in FIG. 7. Since the path to L is already formed by the paths j, k, l, m and n, the remote alarm transfer cell is automatically transferred to L of the communication station 20 as shown in FIG. 9.

The AIS cell is generated by the AIS cell generator 3 of the ATM cross-connect unit 13 in response to the abnormality detected by the abnormality detector 1. This AIS cell is transferred from the cross-connect part 6 of the ATM cross-connect unit 13 to the communication station 21 via the ATM cross-connect unit 14, as shown in FIG. 9. On the other hand, the AIS cell generator 3 notifies the generation of the AIS cell to the network management center 8 via a line #4 shown in FIG. 6. In other words, the generation of the AIS cell is notified to the network management center 8 via the interface 7.

When the ATM cross-connect unit 10 receives the remote alarm transfer cell, this receipt of the remote alarm transfer cell is notified to the network management center 8 via a line #1 as shown in FIG. 9. In addition, when the ATM cross-connect unit 14 receives the remote alarm transfer cell, the ATM cross-connect unit 14 notifies the detection of the remote alarm transfer cell to the network management center 8 via a line #5 as shown in FIG. 9.

In other words, when the ATM cross-connect unit detects a fault, the remote alarm transfer cell is transferred to the remote communication station via the remote path which is preset in the path setting table. Thus, the fault information is quickly transferred to the remote communication station.

Furthermore, the remote alarm transfer cell is quickly transferred to the remote communication station in a similar manner also when the synchronization error detector 2 detects a synchronization error.

Figure 10:
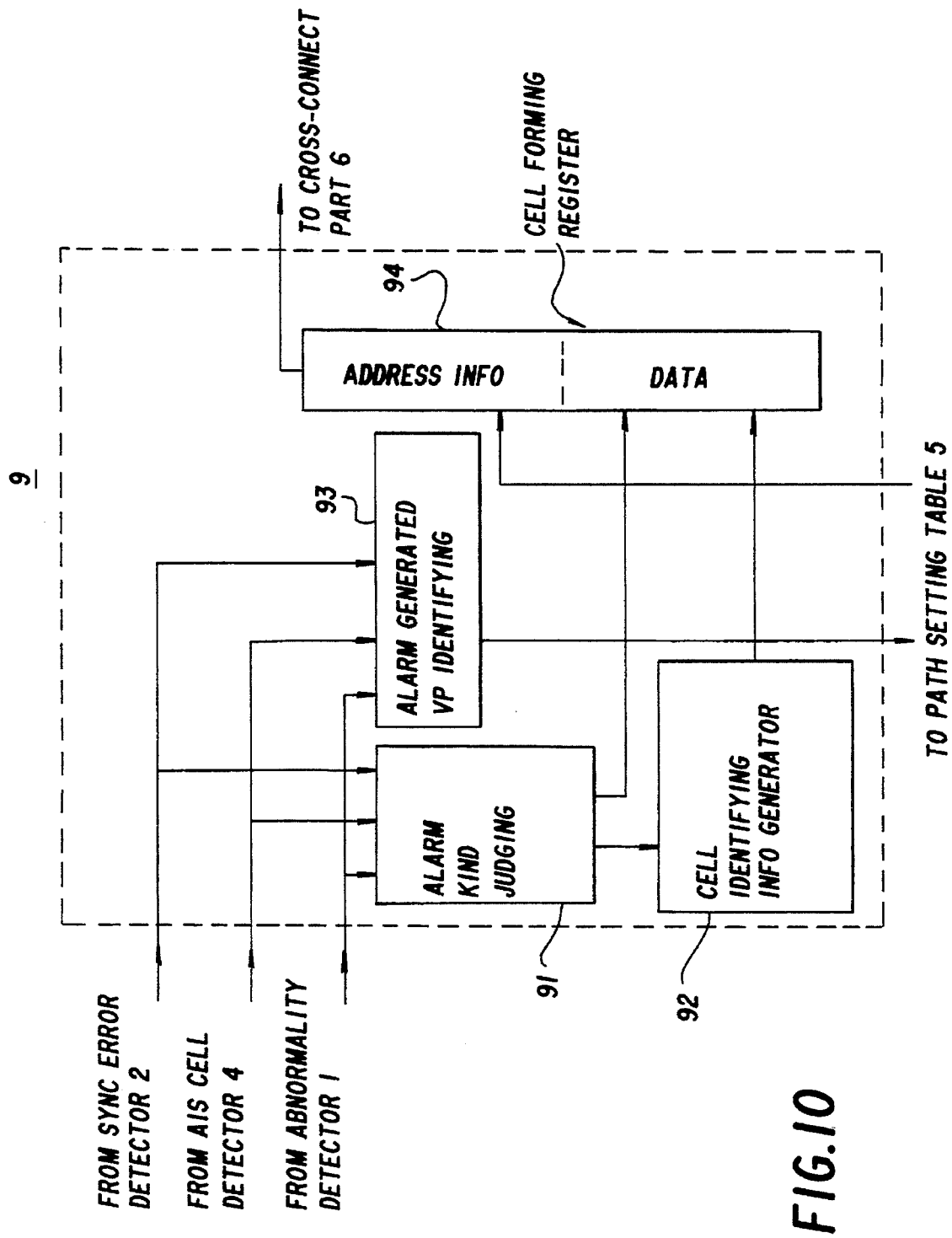
FIG. 10 is a system block diagram showing an embodiment of a remote alarm transfer cell generating part shown in FIG. 5.

FIG. 10 shows an embodiment of the remote alarm transfer cell generator 9 shown in FIG. 5.

The remote alarm transfer cell generator 9 shown in FIG. 10 includes an alarm kind judging part 91, a cell identifying information generator 92, an alarm generated virtual path identifying part 93, and a cell forming register 94 which are connected as shown. The alarm kind judging part 91 and the alarm generated virtual path identifying part 93 respectively receive the output signals of the abnormality detector 1, the synchronization error detector 2 and the AIS cell detector 4.

When an abnormality in the received cell is detected, the alarm kind determines part 91 judges the cause of the abnormality and generates an alarm kind data which is to be transmitted based on the cause. This alarm kind data is transferred to a data part of the cell forming register 94. In addition, the cell identifying information generator 92 generates an identification code for the remote alarm transfer cell in response to a notification received from the alarm kind judging part 91, and this identification code is transferred to the data part of the cell forming register 94.

On the other hand, the alarm generated virtual path identifying part 93 specifies the virtual path in which the abnormality is detected, and notifies the abnormality detected virtual path identifier (VPI) information to the path setting table 5 in order to obtain the destination information related to the remote alarm transfer cell. The path setting part 5 retrieves the destination VPI information based on the abnormality detected VPI information, and the corresponding VPI information is transferred to an address part of the cell forming register 94 if the corresponding VPI information is retrieved. The cell forming register 94 forms a cell from the address value and data which are received, and transfers the formed cell to the cross-connect part 6.

Further, the present invention is not limited to these embodiments, but various variations and modifications may be made without departing from the scope of the present invention.

What is claimed is:

1. An asynchronous transfer mode cross-connect unit for use in an asynchronous transfer mode communication system, said asynchronous transfer mode communication system includes at least two communication stations which are connected via a plurality of asynchronous transfer mode cross-connect units, each said asynchronous transfer mode cross-connect unit comprising:

abnormality detecting means, coupled to a first input signal path, for outputting a detection signal when an abnormality is detected in the first input signal path;

synchronization error detecting means, coupled to the first input signal path, for outputting a detection signal when a synchronization error is detected in a signal received via the first input signal path;

alarm indication signal cell generating means, coupled to said abnormality detecting means and to said synchronization error detecting means, for generating an alarm indication signal when the detection signal is output from at least one of said abnormality detecting means and said synchronization error detecting means;

alarm indication signal cell detecting means, coupled to the first input signal path, for outputting said alarm indication signal when an alarm indication signal is received via the first input signal path;

remote alarm transfer cell generating means, coupled to said abnormality detecting means, to said synchronization error detecting means and to said alarm indication signal cell detecting means, for generating a remote alarm transfer signal which indicates a failure based on the detection and alarm indication signals from said abnormality detecting means, said synchronization error detecting means and said alarm indication signal cell detecting means;

path setting table means for prestoring output signal paths and a remote alarm transfer path for transferring the remote alarm transfer signal to a transmitting communication station; and control means coupled to said alarm indication signal cell generating means, to said remote alarm transfer cell generating means, to said path setting table means, to a second input signal path and to first and second output signal paths, for transferring remote alarm transfer signal, in response to said failure, to the transmitting communication station via the first output signal path according to the remote alarm transfer path set in said path setting table means, said path setting table means prestoring said output signal paths with respect to each of the input signal paths.

2. The asynchronous transfer mode cross-connect unit as claimed in claim 1, wherein the asynchronous transfer mode communication system includes a network management center for controlling each of the asynchronous transfer mode cross-connect units, said asynchronous transfer mode cross-connect unit further comprises interface means coupled to said path setting table means, and the paths are set in said path setting table means from the network management center via said interface means.

3. The asynchronous transfer mode cross-connect unit as claimed in claim 2, wherein the paths are set in said path setting table means from the network management center during an initializing operation.

4. The asynchronous transfer mode cross-connect unit as claimed in claim 2, wherein said control means transfers the remote alarm transfer signal to the transmitting communication station via the remote alarm transfer path which is set in said path setting table means without transferring the remote alarm transfer signal to the network management center.

5. The asynchronous transfer mode cross-connect unit as claimed in claim 2, wherein said alarm indication signal cell generating means notifies the network management center that the alarm indication signal is generated via said interface means.

6. The asynchronous transfer mode cross-connect unit as claimed in claim 1, wherein said control means further comprises means for outputting the alarm indication signal, in response thereto, to the second output signal path and for transferring said alarm indication signal via the path set in said path setting table means.

7. An asynchronous transfer mode communication system including an asynchronous transfer mode network including a plurality of asynchronous transfer mode cross-connect units; a first communication station provided on an upstream side of said asynchronous transfer mode network; and a second communication station provided on a downstream side of said asynchronous transfer mode network, each of said asynchronous transfer mode cross connect units comprising:

abnormality detecting means, coupled to a first input signal path on the upstream side, for outputting a detection signal when an abnormality is detected in the first input signal path;

synchronization error detecting means, coupled to the first input signal path, for outputting a detection signal when a synchronization error is detected in a signal received via the first input signal path;

alarm indication signal cell generating means, coupled to said abnormality detecting means and to said synchronization error detecting means, for generating an alarm indication signal when the detection signal is received from at least one of said abnormality detecting means and said synchronization error detecting means;

alarm indication signal cell detecting means, coupled to the first input signal path, for outputting an alarm indication signal when said alarm indication signal is received via the first input signal path;

remote alarm transfer cell generating means, coupled to said abnormality detecting means, to said synchronization error detecting means and to said alarm indication signal cell detecting means, for generating a remote alarm transfer signal which indicates a failure based on said detection and alarm indication signals from said abnormality detecting means, said synchronization error detecting means and said alarm indication signal cell detecting means;

path setting table means for prestoring output signal paths and a remote alarm transfer path for transferring the remote alarm transfer signal to said first communication station; and control means coupled to said alarm indication signal cell generating means, to said remote alarm transfer cell generating means, to said path setting table means, to a second input signal path on the downstream side and to first and second output signal paths respectively on the upstream and downstream sides, for transferring the remote alarm transfer signal, in response to said failure, to said first communication station via the first output signal path on the upstream side according to the remote alarm transfer path set in said path setting table means, said path setting table means prestoring said output signal paths with respect to each of the input signal paths.

8. The asynchronous transfer mode communication system as claimed in claim 7, which further comprises a network management center for controlling each of said asynchronous transfer mode cross-connect units, each of said asynchronous transfer mode cross-connect units further comprises interface means coupled to said path setting table means, and the paths are set in said path setting table means from said network management center via said interface means.

9. The asynchronous transfer mode communication system as claimed in claim 8, wherein the paths are set in said path setting table means from said network management center during an initializing operation.

10. The asynchronous transfer mode communication system as claimed in claim 8, wherein said control means transfers the remote alarm transfer signal to said first communication station via the remote alarm transfer path which is set in said path setting table means without transferring the remote alarm transfer signal to said network management center.

11. The asynchronous transfer mode communication system as claimed in claim 8, wherein said alarm indication signal cell generating means notifies said network management center that the alarm indication signal is generated via said interface means.

12. The asynchronous transfer mode communication system as claimed in claim 7, wherein said control means further comprises means for outputting the alarm indication signal, in response thereto, to the second output signal path on a downstream side and for transferring said alarm indication signal via the path set in said path setting table means.

13. An asynchronous transfer mode cross-connect method for use in an asynchronous transfer mode communication system, said asynchronous transfer mode communication system includes at least two communication stations which are coupled via a plurality of asynchronous transfer mode cross-connect units, said asynchronous transfer mode cross-connect method comprising the steps of:

(a) outputting a first detection signal from one of said asynchronous transfer mode cross-connect units when an abnormality is detected in a first input signal path;

(b) outputting a second detection signal from said one of said asynchronous transfer mode cross-connect units when a synchronization error is detected in a signal received via the first input signal path;

(c) generating an alarm indication signal within said one of said asynchronous transfer mode cross-connect units when at least one of the first and second detection signals is output;

(d) generating a remote alarm transfer signal which indicates a failure based on a) the first and second detection signals and b) an alarm indication signal which is received via the first input signal path; and (e) transferring the remote alarm transfer signal, in response to the failure, to a transmitting communication station via a first output signal path according to a remote alarm transfer path set in a path setting table in which an output signal path is also set with respect to each input signal path.

14. The asynchronous transfer mode cross-connect method as claimed in claim 13, wherein the asynchronous transfer mode communication system includes a network management center for controlling each of the asynchronous transfer mode cross-connect units, and said method further comprises the step of (f) setting the paths in the path setting table from the network management center.

15. The asynchronous transfer mode cross-connect method as claimed in claim 14, wherein said step (f) sets the paths in the path setting table from the network management center during an initializing operation.

16. The asynchronous transfer mode cross-connect method as claimed in claim 14, wherein said step (e) transfers the remote alarm transfer signal to the transmitting communication station via the remote alarm transfer path which is set in the path setting table without transferring the remote alarm transfer signal to the network management center.

17. The asynchronous transfer mode cross-connect method as claimed in claim 14, wherein said step (c) notifies the network management center that the alarm indication signal is generated.

18. The asynchronous transfer mode cross-connect method as claimed in claim 13, wherein said step (e) outputs the alarm indication signal, in response thereto, to the second output signal path and transfers said alarm indication signal via the path set in the path setting table.

* * * * *